United States Patent [19]

Munger

[11] Patent Number: 5,435,890
[45] Date of Patent: Jul. 25, 1995

[54] APPARATUS FOR PRODUCING A RUBBER EXTENDER/PLASTICIZING AGENT FROM USED AUTOMOBILE RUBBER TIRES

[76] Inventor: Joseph H. Munger, E. 1817 Springfield, Spokane, Wash. 99202

[21] Appl. No.: 911,906

[22] Filed: Jul. 10, 1992

Related U.S. Application Data

[62] Division of Ser. No. 559,043, Jul. 26, 1990, Pat. No. 5,157,176.

[51] Int. Cl.⁶ .................................................. C10B 1/04
[52] U.S. Cl. .................................... 202/93; 202/112; 48/76; 48/111; 201/25; 201/34; 201/36
[58] Field of Search ...................... 202/93, 121; 48/76, 48/111; 201/25, 34, 36

[56] References Cited

U.S. PATENT DOCUMENTS

| | | | |
|---|---|---|---|
| 1,509,667 | 9/1924 | Catlin | 201/34 |
| 1,846,363 | 2/1932 | Schisler | 585/241 |
| 2,710,828 | 6/1955 | Scott | 201/34 |
| 3,582,279 | 6/1971 | Beckman | 23/209.2 |
| 3,639,111 | 2/1972 | Brink et al. | 48/111 |
| 3,704,108 | 11/1972 | Alpert | 48/62 |
| 3,901,951 | 8/1975 | Nishizaki | 260/669 R |
| 3,970,524 | 7/1976 | Funk | 201/25 |
| 4,029,550 | 6/1977 | Mitsui et al. | 201/25 |
| 4,030,984 | 6/1977 | Chambers | 201/25 |

(List continued on next page.)

FOREIGN PATENT DOCUMENTS

| | | |
|---|---|---|
| 2462495 | 6/1977 | Germany . |
| 2731810 | 12/1978 | Germany . |
| 2030273 | 4/1980 | United Kingdom ................. 201/25 |
| 90/14409 | 5/1990 | WIPO . |

OTHER PUBLICATIONS

Reed, Thomas B. et al., *Handbook of Biomass Downdraft Gasifier Engine Systems,* SERI, a Division of Midwest Research Institute, Golden, Colo. (US Dept. of Energy (Mar. 1988).

"Kleenair Pyrolysis Systems", Conrad Industries, Inc. Centralia, Washington.
"Machine Puts Tires On Recycling Road", Austin American–Statesman, (Oct. 1991).
Dodds, J. et al., "Scrap Tires: A resource and Technology Evaluation of Tire Pryolysis and other Selected Alternative Technologies", EG&G Idaho, Inc. (US Dept of Energery (Nov. 1983).
Kearney, A. T., "Scrap Tire Use/Disposal Study (Final Report)", Scrap tire Management Council, Sep. 11, 1990.

*Primary Examiner*—W. Gary Jones
*Assistant Examiner*—Mark De Simone
*Attorney, Agent, or Firm*—Wells, St. John, Roberts, Gregory & Matkin

[57] ABSTRACT

A preferred embodiment of the apparatus 10 for recycling used automobile rubber tires is described in which small pieces of rubber tires are progressively fed into a vertical reactor 14 of the counter-flow type in which the material progressively descends downward through the reactor 14 with process gases passing upward through the downwardly descending material to decompose and volatilize the rubber material. Oxygen-bearing gas is injected into the reactor to burn a portion of the rubber carbon to generate hot combustion gases that ascend upwardly to pyrolitically decompose the rubber pieces, and to volatilize such material. The amount of oxygen is controlled in an oxygen-deficient manner to maintain the temperature in the combustion zone at a temperature of less than 500° F. The gases and volatilized rubber materials and oils are removed from the reactor at a temperature of approximately 350° F. at an elevation below the top layer of the rubber pieces in a high velocity stream to maintain the oils entrained in the air stream. The air stream is directed into condensers for condensing the rubber process oils. The raw rubber process oils are subdivided to obtain a residue heavy fraction rubber oil material having a flash point of greater than 340° F. and greater at one atmosphere and a boiling point of greater than 450° F. at 20 mm Hg.

13 Claims, 6 Drawing Sheets

U.S. PATENT DOCUMENTS

| | | | |
|---|---|---|---|
| 4,038,100 | 7/1977 | Haberman | 106/307 |
| 4,108,730 | 8/1978 | Chen et al. | 201/25 |
| 4,123,332 | 10/1978 | Rotter | 201/15 |
| 4,203,804 | 5/1980 | Janning et al. | 202/121 |
| 4,235,676 | 11/1980 | Chambers | 202/118 |
| 4,240,587 | 12/1980 | Letsch | 241/23 |
| 4,284,616 | 8/1981 | Solbakken et al. | 423/461 |
| 4,306,506 | 12/1981 | Rotter | 110/229 |
| 4,308,103 | 12/1981 | Rotter | 1/6 |
| 4,309,195 | 1/1982 | Rotter | 48/76 |
| 4,336,131 | 6/1982 | Schmidt et al. | 48/111 |
| 4,384,151 | 5/1983 | Audibert et al. | 585/241 |
| 4,401,513 | 8/1983 | Brewer | 1/6 |
| 4,452,154 | 6/1984 | Kono et al. | 201/34 |
| 4,507,174 | 3/1985 | Kutrieb | 202/97 |
| 4,588,477 | 5/1986 | Habib | 201/25 |
| 4,647,443 | 3/1987 | Apffel | 423/449 |
| 4,648,328 | 3/1987 | Keough | 110/229 |
| 4,686,008 | 8/1987 | Gibson | 202/118 |
| 4,740,270 | 4/1988 | Roy | 201/35 |
| 4,746,406 | 5/1988 | Timmann | 201/25 |
| 5,106,390 | 4/1992 | Beierle et al. | 201/34 |

APPARATUS FOR PRODUCING A RUBBER EXTENDER/PLASTICIZING AGENT FROM USED AUTOMOBILE RUBBER TIRES

RELATED APPLICATIONS

This application is a divisional application of U.S. patent application Ser. No. 559,043, filed Jul. 26, 1990, entitled "Recycling Process, Apparatus and Product Produced by Such Process for Producing A Rubber Extender/Plasticizing Agent From Used Automobile Rubber Tires". Such application has matured into U.S. Pat. No. 5,157,176, issued Oct. 20, 1992.

TECHNICAL FIELD

This invention relates to the recycling of used automobile rubber tires and more particularly to pyrolytic apparatus for reclaiming a rubber process oil from the tires that is reusable as a rubber extender/plasticizing agent.

BACKGROUND OF THE INVENTION

The pyrolytic treatment of scrap or waste automobile rubber tires has been extensively investigated particularly since the petroleum oil embargo in 1973. The prospect of obtaining useable oil from the tires has been a major focus of many researchers.

Such pyrolytic treatment of used tires involves the application of heat, generally ranging between 600° F. and 1400° F., in an oxygen-limited atmosphere. The products emulating from such pyrolytic treatment were (1) a combustible gas having a heating value of approximately 750 BTU per cubic foot, (2) a recovery oil having a gross heating value of 18,000 BTU per lb., and (3) carbon black (char). Generally the relative amounts of each product varied somewhat with temperature, pressure and detention time. Typical recovery ratios range from 5 to 20 percent gas, 20 to 50 percent oil, and 30 to 50 percent carbon black.

Typically the pyrolytic gas is burned to provide the heat energy for the pyrolytic process. Thus the economic feasibility centered principally on the commercialization of the pyrolytic oil and the carbon black rather than on the sale of the process gas.

The recovered rubber process oil had properties similar to No. 2 fuel oil and in many instances may be used in applications where No. 2 fuel oil is specified. Thus the commercial value of the recovered rubber process oil fluctuated with the price of No. 2 fuel oil. Furthermore it does not appear that the rubber process oil is acceptable for all heating oil applications. A detailed analysis of the rubber process oil reveals the presence of numerous chemicals which may be hazardous or toxic then burned causing unacceptable air contamination problems.

The carbon black obtained from pyrolysis can be used in a few applications as coloring in paints and dyes and coloring in low grade rubber products. Generally the carbon black contains an ash content of 10 percent with makes it unacceptable, without further rather expensive refining, for use in new tires. The new tire industry is the largest user of carbon black. Thus even the recovered carbon black has limited commercial value.

Consequently, despite the investment of large sums of money in research and development by both private and public organizations, the economic feasibility of the pyrolytic treatment of automobile rubber tires to obtain recyclable bi-products has yet to be demonstrated.

Thus the vast majority of used rubber tires continue to be stockpiled in unattractive piles or disposed of in land fills or, if the demographics are favorable, burned as a primary or secondary fuel in an incinerator to produce electricity.

One of the objectives and advantages of this invention to be able to produce a valuable rubber process oil from used automobile rubber tires that is reusable as a petroleum based, rubber extender/plasticizing agent. These and other objects and advantages will become apparent upon reading the following description of a preferred embodiment of this invention.

BRIEF DESCRIPTION OF THE DRAWINGS

The preferred embodiment of this invention is illustrated in the accompanying drawings, in which.

DETAILED DESCRIPTION OF A PREFERRED EMBODIMENT

The following disclosure of the invention is submitted in furtherance with the constitutional purpose of the Patent Laws "to promote the progress of science and useful arts" (Article 1, Section 8).

Figure 1:
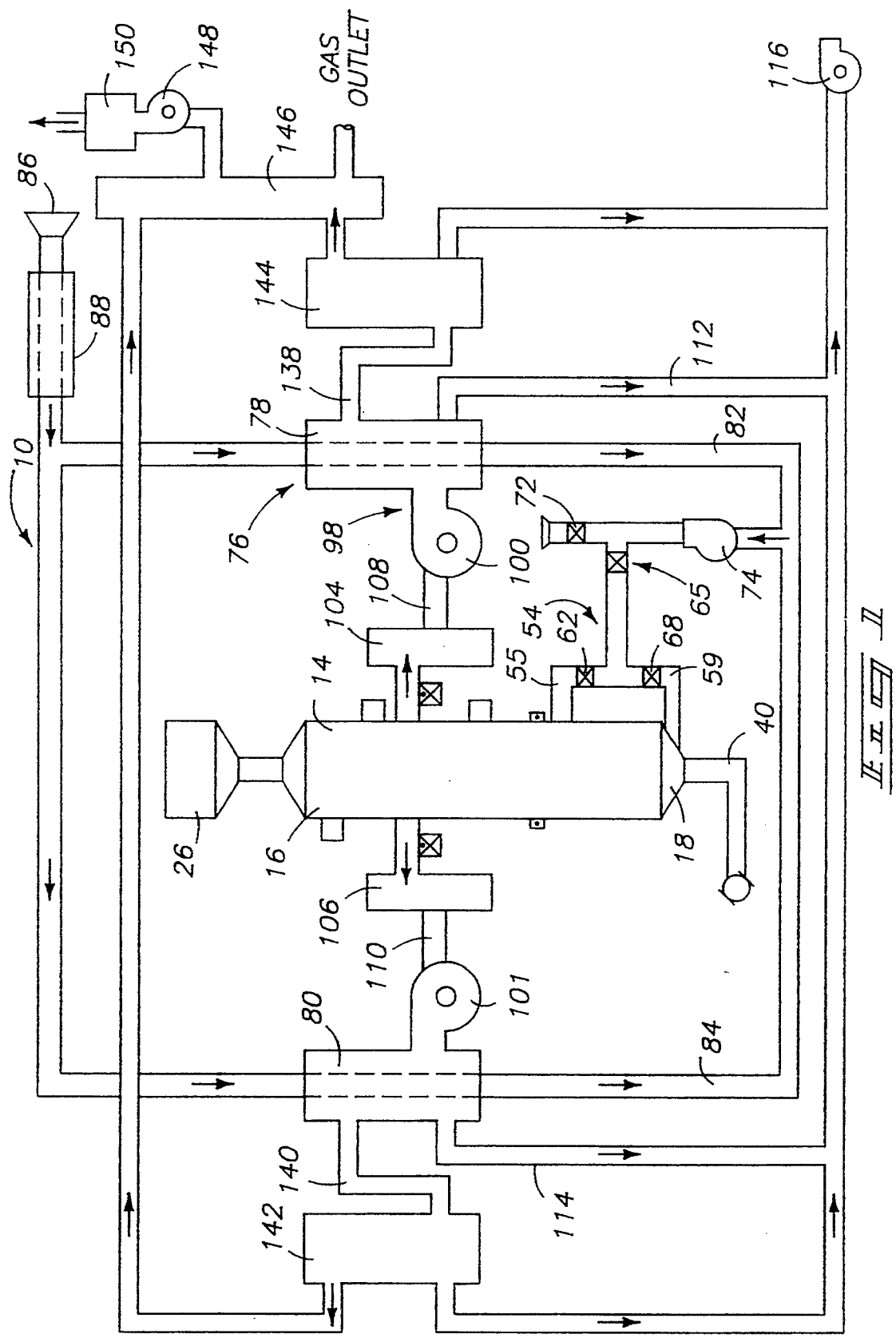
FIG. 1 is a schematic flow diagram of the apparatus for recycling used automobile rubber tires according to the preferred embodiment of the invention to obtain a rubber process oil and a pyrolytic gas.

Referring now to FIG. 1, there is illustrated in schematic flow diagram for an apparatus for recycling used automobile, vulcanized styrene-butadiene rubber (SBR) tires to obtain a rubber processing oil from the tires that is reusable as a rubber extender/plasticizing agent. The apparatus is generally designated with the numeral 10. The apparatus is designed to process small pieces 12 of used automobile, vulcanized styrene-butadiene rubber tires. The pieces should be no larger than 0.50–2.0 inches in a major dimension with most of the metal material (belting and beads) removed. Preferably the small pieces should be between 0.75 and 2.0 inches in their major dimensions. Optimally the same pieces should have a major dimension of between 0.75 and 1.75 inches. The small pieces are frequently referred to as tire chips.

Figure 4:
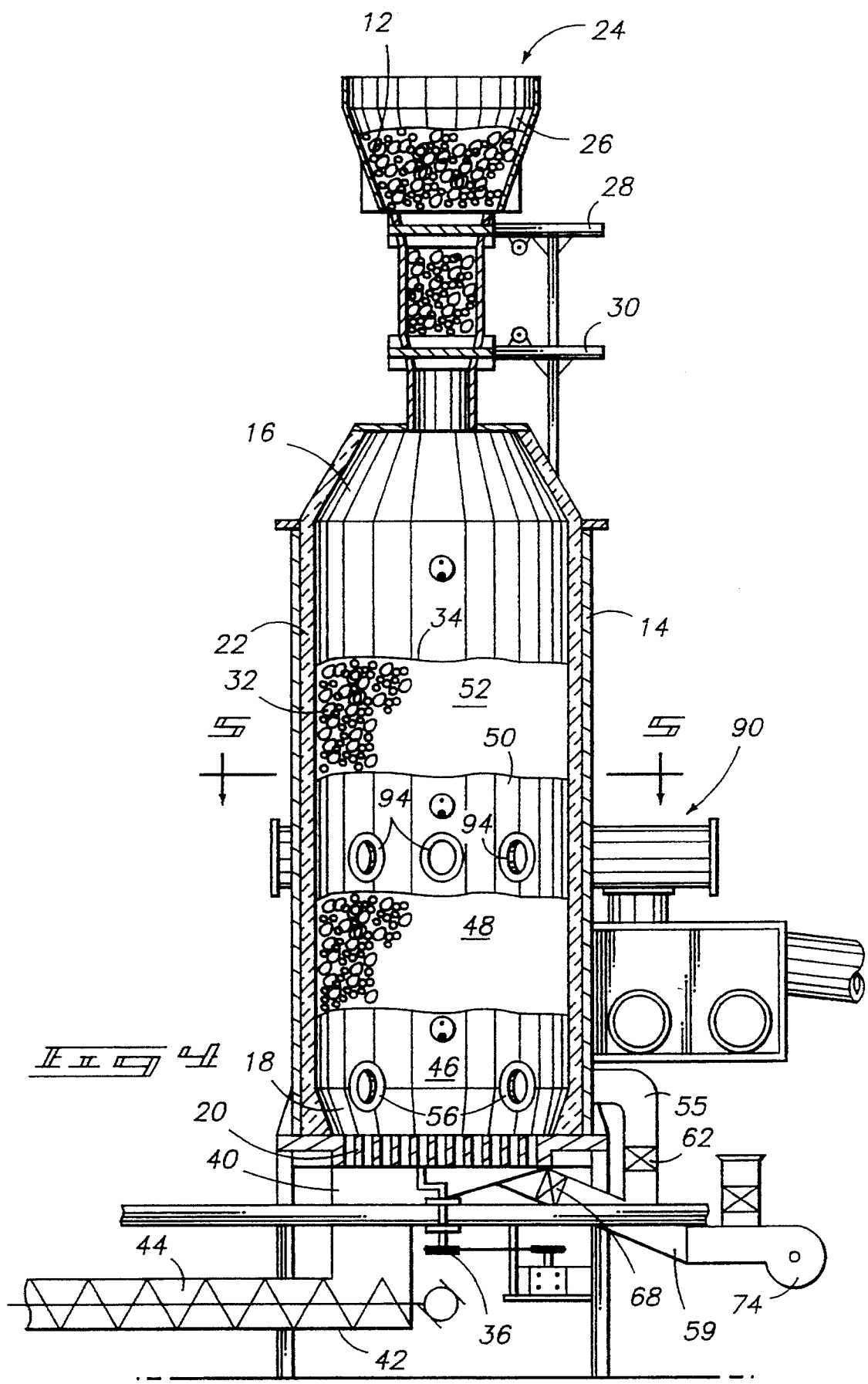
FIG. 4 is a schematic representation of an elevational view of a reactor filled with a column of small pieces of used automobile rubber tires for processing to obtain pyrolytic gases, entrained rubber process oils and solid carbon/ash residue.

One of the principal components of the apparatus 10 is an enclosed vertically-oriented reactor 14 that has an upper end 16 and a lower end 18. As illustrated in FIG. 4, the reactor includes a grate 20 for supporting a vertical column 32 of the small pieces within the reactor 14. The reactor 14 has vertical sidewalls 22 that extend upward from the grate 20 to the upper end 16. At the upper end 16 there is a feed means generally designated with the numeral 24 for successively feeding the small rubber pieces 12 into the reactor to form the vertical column 32. The feed means 24 includes a hopper 26 for receiving small pieces 12 from some type of conveying system. Below the hopper 26 is provided two airlock valves 28 and 30 that are sequentially operated to charge the reactor 14 with the small rubber pieces 12 in a designed sequence and rate to maintain a top layer 34 of the vertical column 32 above a desired elevation particularly the gaseous outlet.

The grate 20 includes a means 36 for vibrating the grate 20 to facilitate the downward descent of the pieces 12 as they are being decomposed and to minimize any bridging or coagulation of solid residue such as carbon, ash, fibers, and metal. A solid residue collector 40 is positioned below the grate 20 to receive the solid residue. The collector includes a solid conveyor 42 with an auger 44 for conveying the solid residue from the reactor. The apparatus and the process is designed so that the reactor 14 operates in a continuous countercurrent fashion in which the solid materials progressively move downwardly and the gaseous materials progressively moves upward. Such a reactor 14 is frequently referred to as a "up-take" reactor.

For purposes of description, the interior of the reactor 14 is divided for purpose of description into various zones including a oxidation zone 46. In the oxidation zone 46, carbon is oxidized to form carbon dioxide and other hot oxidized gases, including water vapor. The amount of oxygen is controlled to provide an oxygen-lean atmosphere providing substantial incomplete combustion. Immediately above the oxidation zone 46 is a precombustion or a reduction zone 48 in which the hot gases from zone 46 further combine with the carbon to reduce the combustion gases to carbon monoxide and other intermediaries. Above the precombustion or reduction zone 48 is the pyrolytic zone 50 in which the upward moving hot gases progressively thermally decompose the rubber material into its solid carbon component and gaseous/vaporized components including rubber process oils. Above the pyrolytic zone 50 is a preheating zone that extends to the top layer 34 for preheating the small pieces prior to descending into the pyrolytic zone. The precise interface between each of these zones are undefined other than the zones identify the principal reactions and interactions that are taking place within such zones.

The apparatus 10 includes gas inlet means 54 for supplying an oxygen-bearing gas to the reactor 14 at the combustion zone 46 for generating hot combustible gases that are directed upward by the sidewalls 22 for providing the heat necessary to pyrolytize the small rubber pieces in the pyrolytic zone 50. Preferably the oxygen-bearing gas is air. The gas inlet means 54 includes an air inlet line 55 with a plurality of air inlets 56 for supplying the air at uniformly angularly spaced locations about the reactor to uniformly oxidize a portion of the carbon to generate the hot gases. Additionally the air inlet means 54 includes a lower branch line 59 that supplies air to the reactor below the grate 20 to facilitate the oxidation of at least a portion of the carbon.

The apparatus 10 includes air control means 65 for controlling the amount of oxygen-bearing gas emitted into the reactor at the combustion zone 46 for controlling the temperature of the combustion gases and thus the temperature of the gases that ascend for accomplishing pyrolytic decomposition of the rubber pieces. The air control means 65 includes a control valve 66 mounted in the line 55 for controlling the air to the inlets 56 and a control valve 68 for controlling the flow of air to beneath the grate. Additionally the control means includes an exhaust valve 72 for exhausting the air to atmosphere if desired. The control means 65 is operatively interconnected to temperature sensors that are placed at desired locations within the reactor for sensing the temperature particularly within the combustion zone 46. In a preferred embodiment, control means 65 adjusts the amount of oxygen- bearing gas emitted into the combustion zone to maintain the temperature in the combustion zone less than 500° F. and, more preferably, between 350° F. and 500° F. to promote thermal decomposition of the tire pieces while minimizing thermal cracking or destruction of the volatile hydrocarbons.

The apparatus 10 includes pressure means that includes a fan 74 for applying the oxygen-bearing gas to the combustion chamber 46 at a pressure slightly above atmospheric pressure.

Additionally the apparatus 10 includes a preheating means 76 for preheating the oxygen-bearing gas prior to its injection into the combustion zone 46 to facilitate the heating and oxidation of at least a portion of the carbon in the combustion chamber to increase the efficiency of the system. The preheating means 76 includes passing the oxygen-bearing gas through vertically oriented air cooled oil condensers 78 and 80 in lines 82 and 84 respectively. The oxygen-bearing gas initially enters the system through an intake 86. In the preferred embodiment, the oxygen-bearing gas is initially passed through an air conditioning means 88 to condition the oxygen-bearing gas to an initial operating temperature of between 40° F. and 60° F. to obtain efficient condensation in the condensers 78 and 80 and to control the degree of preheating of the oxygen-bearing gas. Preferably, the air conditioning means 88 maintains the temperature at the intake 86 prior to passing through the condensers 78 and 80 at between 45° F. and 60° F. A most preferred temperature would be approximately 55° F.

Consequently the oxygen-bearing gas that is utilized in the combustion chamber 46 for burning a portion of the carbon to generate hot gases is initially preheated by passing the oxygen-bearing gases through the condensers 78 and 80 to increase the temperature from a controlled temperature of between 40° F. and 60° F. to an elevated temperature of approximately 140° F. prior to injection into the combustion zone 46.

The apparatus 10 further includes a very important component of a gas outlet means 90 for exhausting gases including combustion gases, inert gases, pyrolytic gases and volatilized hydrocarbons decomposed from the rubber (rubber process oils). The gas outlet means 90 removes the gases at an elevation below the top layer 34 of the column as illustrated in FIG. 4 within the pyrolytic zone 50. The outlet means 90 is located at an intermediate position between the grate 20 and the top layer 34 to enable the gases and volatiles to be removed at approximately 350° F.

Figure 5:
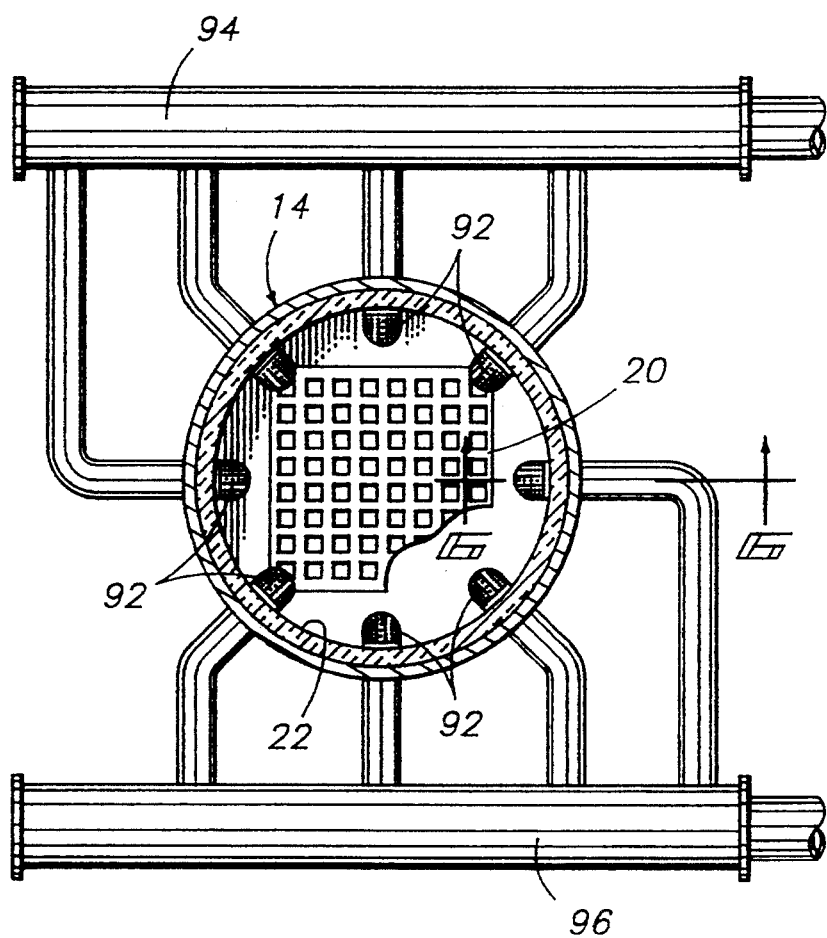
FIG. 5 is a horizontal cross sectional view taken along line 5—5 in FIG. 4 showing an outlet manifold system for removing the pyrolytic gases and entrained rubber process oils at evenly spaced locations about the periphery of the reactor.
Figure 6:
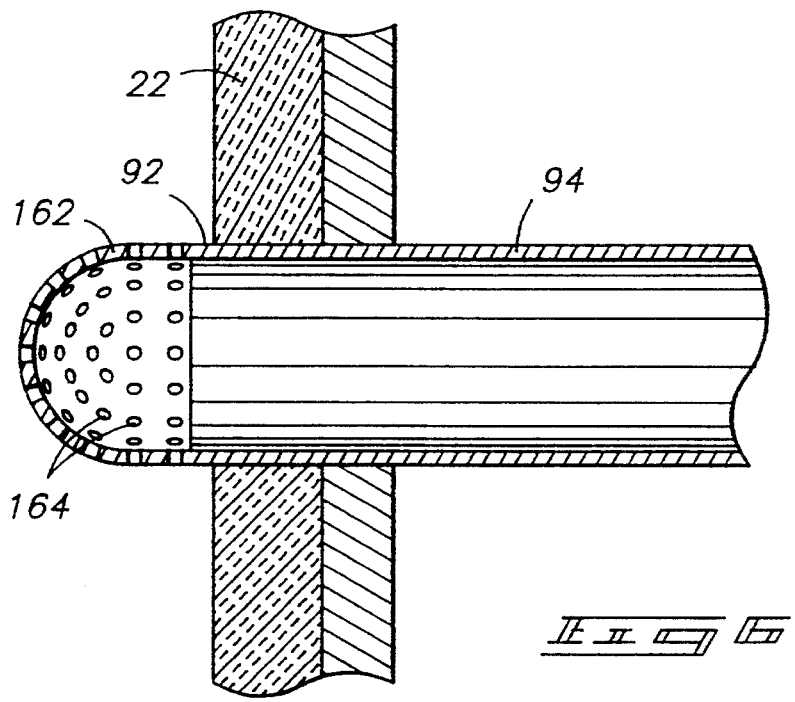
FIG. 6 is a fragmentary isolated view of a single outlet of the manifold system illustrated in FIG. 5.
Figure 7:
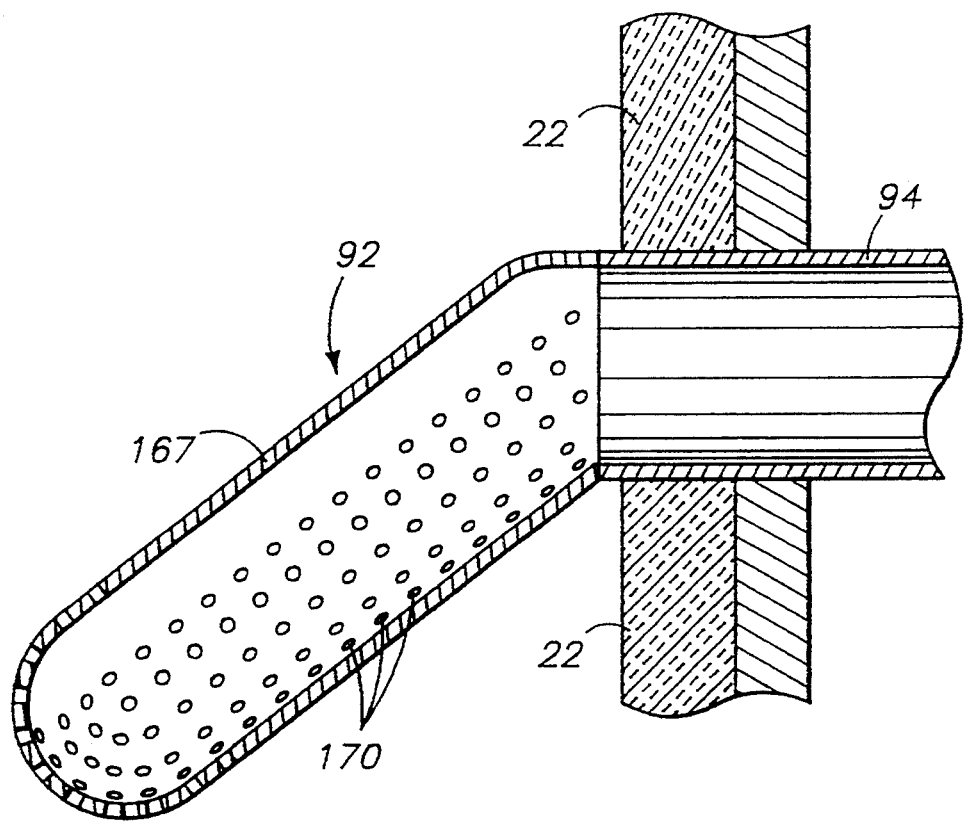
FIG. 7 is a fragmentary isolated view of a single outlet for receiving the pyrolytic gases and entrained rubber process oils in which the outlet has a projecting element that extends inward into the reactor for removing the gases at evenly spaced angular positions spaced from the inner wall of the reactor.

The gas outlet means 90 includes a plurality of evenly spaced outlet openings 92 formed in the vertical sidewalls 22 of the reactor. Details of the outlet openings are illustrated in FIGS. 5-7. It is important in removing the gases and volatiles to have the gases within the reactor 14 to flow upward countercurrent to the movement of the solid material in an even flow permeating the solid material throughout the entire cross section of the reactor so as to minimize any "chimney effect" or "channeling" to obtain uniform results.

In the preferred embodiment illustrated in FIG. 5, the gas outlet means 90 includes two manifolds 94 and 96 that are connected to respective outlet openings for drawing and removing the volatiles and gaseous material from the reactor at an elevation below the top layer of the vertical column 32. The small rubber pieces 12 additionally serve as a filter medium to reduce the amount of particulate material that is contained in the gas stream that is removed through the outlet openings 92.

The apparatus 10 includes a vacuum means 98 for applying a vacuum pressure at the outlet openings 92 to not only provide a continuous draw of the gases and volatiles upward through the solid material but to provide a rapid removal of the gases and volatiles at the gas outlet means. The vacuum means 98 in the preferred embodiment includes fans 100 and 101 that are connected to respective manifolds 94 and 96 respectively.

It is desirable to draw the combustion gases and volatiles upward through the reactor at a velocity of between 500 and 1000 feet/min. and then to rapidly remove the gases and the volatile materials from the reactor and between the reactor and direct them to the condensers 78 and 80 at relative very high velocities in an operative range of 4000 and 10000 feet/min. Preferably the gases and volatiles, including rubber processing oils, are being removed through the manifolds 94 and 96 at velocities of approximately 6000 to 8000 feet/min.

After being removed from the reactor, the gases and volatiles are passed through dust boxes 104 and 106 to remove particulate material above a desired size. From the dust boxes, the gases and volatiles are directed through gas lines 108 and 110 to the respective condensers 78 and 80.

The gases and volatiles enter the vertically oriented air cooled condensers 78 and 80 at lower ends of the condensers with the gases and volatiles being directed in an upward swirling spiral motion about the heat transfer cooling lines 82 and 84 to cause vast portions of the rubber process oils to condense and form a raw rubber process oil condensate. It has been found that the system is quite efficient in lowering the temperature of the gases from approximately 350° as they exit the reactor to an exit temperature of approximately 150° F. from the condensers. Thus, the gases enter the condensers at approximately 350° F. and exit at temperatures of approximately 150° whereas the double duty oxygen-bearing gas enters at approximately 40° F.–60° F. and is heated to approximately 140° F.

The condensate is removed from the condensers 78 and 80 through condensate lines 112 and 114. The condensate is conveyed through the lines 112 and 114 by pump 116 to a rubber process oil storage tank 118 (FIG. 2) for initial storage before being further processed to obtain heavy fraction components that are reusable as a rubber extender/plasticizing agent.

The rubber processing oils contain what appears to be a wide continuum of hydrocarbon products that could be utilized as a fuel, particularly a number two grade fuel oil. However, the applicant is able to obtain from the rubber processing oils, a high percentage of unique heavy fraction rubber process oil that has very favorable, unexpected and surprising properties as a rubber extenders/plasticizing agent in the compounding of certain rubber products.

Figure 2:
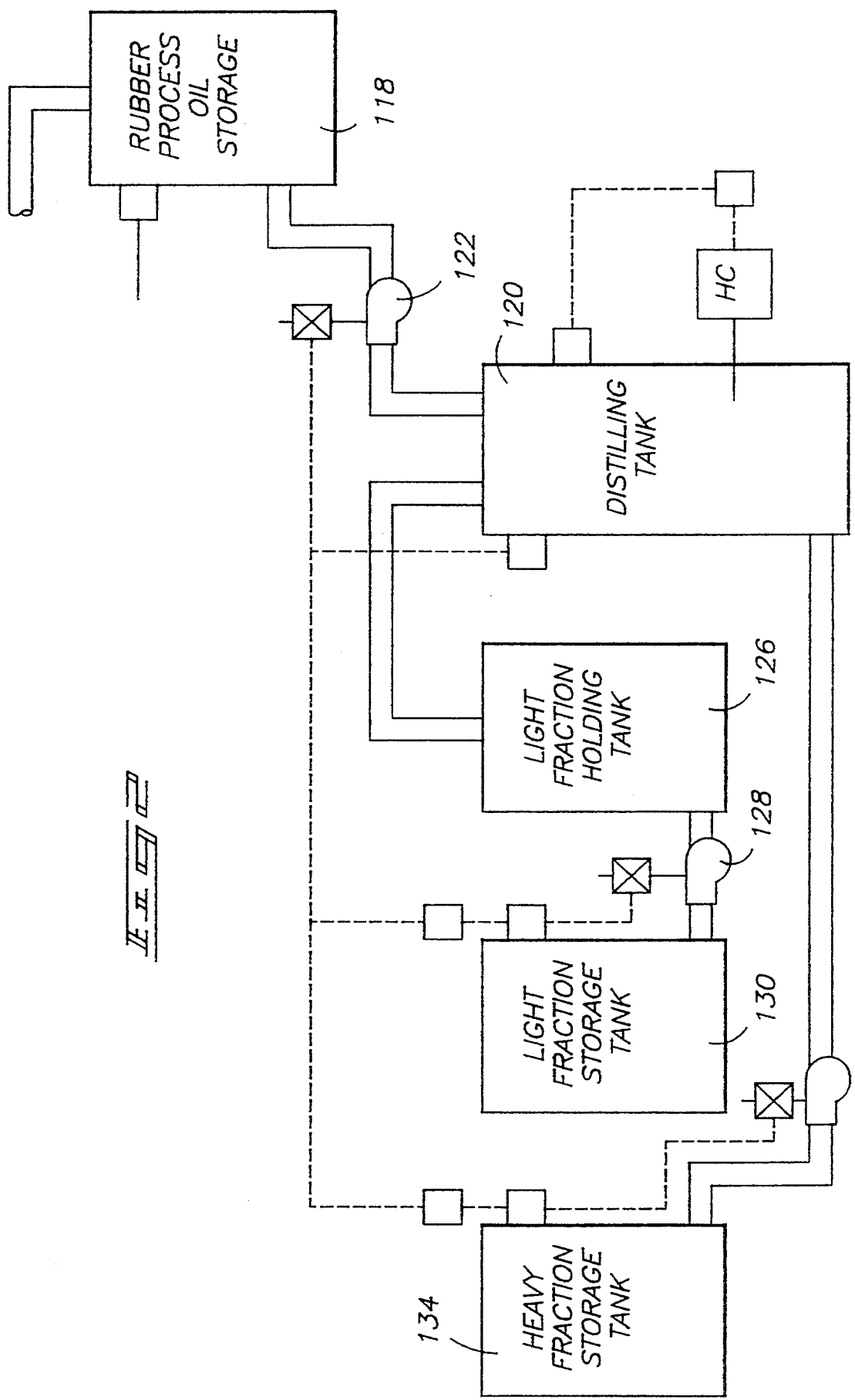
FIG. 2 is a schematic flow diagram of a portion of the apparatus for receiving the rubber process oil and for distilling such oil to obtain a reusable petroleum based, rubber extender/plasticizing agent.

To obtain the desired rubber extender/plasticizing agent, the raw rubber process oils from the storage tank 118 are directed to a distillation tank or column 120 by a pump 122 (FIG. 2). The rubber processing oils are heated in the distillation column at 20 mm of Hg with the lower fraction oils (light fraction distillate) being removed until a boiling point of 450° F. is reached. The heavy fraction residue, having a flash point of 340° F. or greater, was found to have favorable properties as a rubber extender/plasticizing agent. The light fraction distillate is directed to a light fraction holding tank 126. From the holding tank 126 the light fraction oils are conveyed by the pump 128 to a final light fraction storage tank 130.

The applicant has found that the light fraction distillate represents only approximately 20 to 30% of the raw rubber process oil from the storage tank 118. The remaining heavy fraction extender/plasticizing agent is then conveyed from the distilling tank 120 by a pump 132 to a heavy fraction storage tank 134. In the preferred embodiment, the rubber processing oils are heated in the distilling tank 120 at approximately 20 mm Hg to remove the light fraction components having boiling points of less than approximately 450° F. The extender/plasticizing agent is defined as having a flash point of 340° F. or greater at one atmosphere and an initial boiling point of 450° F. at a pressure of approximately 20 mm Hg. Additionally, the extender/plasticizing agent appeared to have a specific gravity of approximately 1.0 and a pour point of approximately 30° F.

The apparatus 10 further includes a gas processing subsystem for handling the uncondensed gases that have not been condensed at the condensers 78 and 80. Such system includes pyrolytic gas lines 138 and 140 (FIG. 1) that extend from the condensers 78 and 80 respectively. Lines 138 and 140 are connected to gas condensers 142 and 144 in which the gases are further cooled to remove any further rubber process condensates. From the gas condensers 142 and 144 the gases are drawn through a combined manifold 146 by gas compressor 152. An exhaust valve 150 and flare-off fan 150 are provided in the gas line downstream of the manifold 146 for exhausting the gases to atmosphere should the pressure in the gas line exceed a predetermined value.

Figure 3:
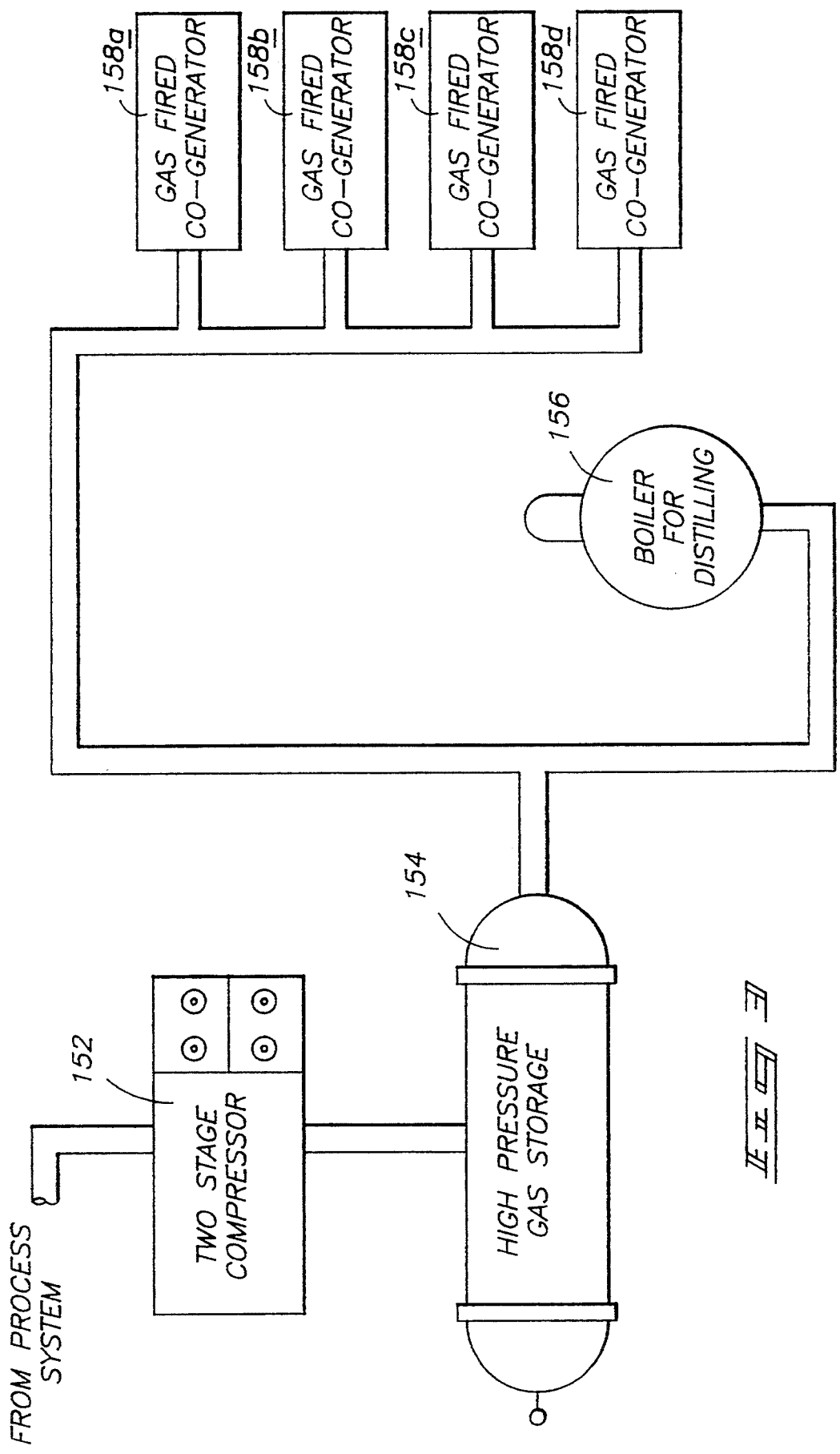
FIG. 3 is a schematic flow diagram of the apparatus for receiving the pyrolytic gas, storing the gas and utilizing the gas for multi-purposes.

As illustrated in FIG. 3, the pyrolytic gases are then compressed by compressors 152 and stored in a high pressure pyrolytic gas storage vessel 154. The gases have a substantial caloric content of approximately 750–950 BTU/scf that can be utilized for a variety of purposes. Particularly the combustible gases are utilized in a boiler 156 that is utilized for distilling the rubber processing oils in the distilling tank 120. Furthermore the pyrolytic gases from storage tank 154 are utilized as a fuel for gas fired co-generators 158*a–d* for providing electrical energy in operating the apparatus 10 complementary components so that the entire system can be essentially self contained. The pyrolyric gas from the high pressure storage 154 can also be utilized in starting the combustion process in the reactor during the start-up phase until combustion is self sustained by the oxygen-bearing gas that is fed to the combustion zone. The electrical energy produced by the gas fired co-generators 158a-d may be sufficient to produce excess amounts of electrical energy that may be utilized for other purposes or sold on the open electrical market.

As previously mentioned, it is quite important that the thermal decomposition and volatilization of the rubber pieces be conducted in a uniform progressive and controlled manner. With this in mind, the outlet openings 92 has uniformly spaced aperture projections 162 that project into the reactor from sidewalls 22 to draw the gases and entrained rubber process oils uniformly from the reactor below the top layer 34 of the column 32. The apertures 164 formed in the aperture projection 162 are preferably less than a one-half inch in diameter so that the small rubber pieces are not pulled into the manifolds 94 and 96.

In an alternate embodiment illustrated in FIG. 7, the gas outlet means 92 includes an elongated projections 167 that extends inward and downward radially towards the center of the reactor 14 to more uniformly draw the gases and volatiles from the reactor. The inward and downward configuration of the enlarged projections 167 provides for efficient removal of the gases and entrained liquids without materially affecting the downward migration of the small rubber pieces 12. The enlarged projection 167 has a pattern 170 of apertures along its lower profile to draw the gases from the reactor. It should be noted that the upper profile or surface of the enlarged projection 167 is without apertures to minimize drawing small particles into the gaseous system.

As previously mentioned, the resultant heavy fraction rubber process oil is usable as an extender/plasticizing agent in the compounding of rubber. Applicant has discovered that the heavy fraction rubber process oil that is obtained by utilizing the process and apparatus of this invention has unique and unexpected results when utilized as an extender/plasticizing agent in the compounding of rubber products. The experimental extender/plasticizing agent was compared with other extender/plasticizing agents that are commercially available. For comparison testing, a common highly-aromatic rubber processing oil having the brand name "Sundex 790" was chosen for use in the formulation of a styrene-budadiene rubber. Sundex 790 has the general properties of a specific gravity of 0.9979; aromatics of 83.6%; Saybolt Viscosity (210° F.) of 90.0; flash point of 420° F.; viscosity gravity constant of 0.954; and Aniline point of 97° F. Additionally, the experimental extender/plasticizing agent was compared with respect to a second common extender/plasticizing agent of a napthenic oil having the brand name "Flexon 766" for compounding an ethylene-propylene terpolmer rubber (EPDM). It is also a common commercially available rubber extender/plasticizing agent for use in formulation of EPDM rubbers. Flexon 766 has the general properties of a specific gravity of 0.891; aromatics of 21%; Saybolt Viscosity (210° F.) of 57.1; and Aniline point of 222° F.

Both the formulated EPDM and SBR rubbers were selected for evaluation because of their substantial differences in the solubility characteristics of the two polymers. Four formulations were devised in which the formulation #1 utilized the Sundex 790 as the extender/plasticizing agent; the applicant's experimental extender/plasticizing agent was utilized in formulation #2; Flexon 766 was utilized as the extender/plasticizing agent in formulation #3; and the applicant's experimental extender/plasticizing agent was utilized in formulation #4. The specific compound recipe for the four formulations are set forth in Table A.

TABLE A

| SBR (Styrene-Butadiene Rubber) | | |
|---|---|---|
| Ingredient | Formation #1 | Formulation #2 |
| SBR 1502 | 100.00 PHR | 100.00 PHR |
| N-330 Carbon Black | 60.00 | 60.00 |
| Sundex 790 | 50.00 | 00.00 |
| Experimental Extender/Plasticizing Agent | 00.00 | 50.00 |
| Zinc Oxide | 5.00 | 5.00 |
| Stearic Acid | 1.00 | 1.00 |
| Antioxidant 2246 | 2.00 | 2.00 |
| Santocure | 1.20 | 1.20 |
| TMTD | 0.50 | 0.50 |
| Sulfur | 1.50 | 1.50 |
| TOTAL | 221.20 | 221.20 |
| Batch Factor | 6.4 | 6.4 |
| EPDM (Ethylene-Propylene Terpolymer Rubber) | | |
| Ingredient | Formation #3 | Formulation #4 |
| Polysar EPDM | 100.00 PHR | 100.00 PHR |
| N-330 Carbon Black | 60.00 | 60.00 |
| Experimental Extender/Plasticizing Agent | 00.00 | 50.00 |
| Flexon 766 | 50.00 | 00.00 |
| Zinc Oxide | 5.00 | 5.00 |
| Stearic Acid | 1.00 | 1.00 |
| Santocure | 0.50 | 0.50 |
| TMTD | 1.00 | 1.00 |
| Sulfur | 1.50 | 1.50 |
| TOTAL | 219.00 | 219.00 |
| Batch Factor | 6.9 | 6.9 |

After the rubber formulations were compounded, they were tested utilizing a variety of tests. The formulations were tested utilizing four tests which are indicated as follows:

| TEST #1 Type - MONSANTO RHEOMETER: ASTM D2084, 320° F. 60 Minute Motor, 20 Second Preheat, MPD Dies, 3° Arc, 100 CPM, 100 Range RESULTS | | | | |
|---|---|---|---|---|
| Sample | Minimum Torque, $M_L$ | Maximum Torque, $M_H$ | Scorch Time, 2 Pt. $t_{s2}$ | Cure Time, % $t_c$ (90) |
| Formulation #1 (SBR) | 4.6 | 51.9 | 3.6 min. | 6.9 min. |
| Formulation #2 (SBR) | 4.7 | 42.7 | 2.8 | 6.0 |
| Formulation #3 (EPDM) | 12.2 | 88.0 | 1.8 | 20.0 |
| Formulation #4 (EPDM) | 14.0 | 54.8* | 1.7 | 5.2 |

| TEST #2 Type - MOONEY VISCOSITY: ASTM D1646, 212° F., Large Rotor | |
|---|---|
| | ML 1' + 4' |
| Formulation #1 (SBR) | 24.5 |
| Formulation #2 (SBR) | 25.0 |
| Formulation #3 (EPDM) | 67.0 |

-continued

TEST #2
Type - MOONEY VISCOSITY: ASTM D1646,
212° F., Large Rotor

| | ML 1' + 4' |
|---|---|
| Formulation #4 (EPDM) | 79.0 |

TEST 3
Type - PHYSICAL PROPERTIES: ASTM
D412, D2240, Scott CRE Tester

| Sample | Modulus (PSI) | | | | | Ultimate | | Shore A Hardness |
|---|---|---|---|---|---|---|---|---|
| | 100% | 200% | 300% | 400% | 500% | Tensile | Elongation | |
| SBR Samples cured 15 minutes/320° F., Unaged | | | | | | | | |
| #1 SBR | 180 | 500 | 970 | 1420 | 1870 | 2160 PSI | 560 PSI | 54 |
| | 170 | 470 | 930 | 1380 | 1900 | 2480 | 610 | |
| | 180 | 430 | 900 | 1350 | 1840 | 1860 | 500 | |
| Median | 180 | 470 | 930 | 1380 | 1870 | 2160 | 560 | |
| #2 SBR | 130 | 330 | 680 | 1020 | 1340 | 2380 | 750 | 53 |
| | 130 | 320 | 620 | 1000 | 1300 | 2350 | 750 | |
| | 120 | 300 | 590 | 920 | 1260 | 2300 | 760 | |
| Median | 130* | 320* | 620* | 1000* | 1300* | 2350* | 750* | |
| EPDM Samples cured 30 minutes/320° F., Unaged | | | | | | | | |
| #3 EPDM | 280 | 780 | 1380 | | | 1950 | 380 | 61 |
| | 270 | 770 | 1400 | | | 1800 | 360 | |
| | 270 | 730 | 1280 | | | 1980 | 400 | |
| Median | 270 | 770 | 1330 | | | 1950 | 360 | |
| #4 EPDM | 150 | 250 | 420 | 630 | 840 | 2780 | 800 | 58 |
| | 140 | 250 | 420 | 620 | 830 | 3070 | 820 | |
| | 130 | 250 | 420 | 620 | 830 | 2950 | 800 | |
| Median | 140* | 250* | 420* | 620* | 830* | 2950* | 800* | |

*Significant Unexpected Results

TEST 4
Type - CONTACT STAIN TEST: ASTM D925 Method A,
Aged 96 Hours @ 158° F., Ditzer Duracryl Lacquer
DL 8000, Sample size as received and one inch long.

| Sample | Results |
|---|---|
| Formulation #1 (SBR) | Sample exhibits a faint, black staining in contact area. |
| Formulation #2 (SBR) | Sample exhibits a faint, black staining in contact area. |
| Formulation #3 (EPDM) | Sample exhibits a faint, black staining in contact area. |
| Formulation #4 (EPDM) | Sample exhibits a dirty, pale yellow stain in contact area. |

TEST 5
LOW TEMPERATURE BRITTLENESS: ASTM D746
Method B, Conditioned 3 Minutes, Fluid for
Immersion: Methanol, 5 Modified T50 (1/10") specimens each
tested - Determine actual temperature.

| Sample | Pass Temp. | Fail Temp. | Comments |
|---|---|---|---|
| SBR #1 | −44° C. | −46° C. | All 5 samples passed 3 passed, 1 cracked, 1 broke |
| SBR #2 | −44° C. | −46° C. | All 5 samples passsed 4 passed 1 broke |
| EPDM #1 | −70° C. | <−70° C. | All 5 samples passed |
| EPDM #2 | −62° C. | −64° C. | All 5 samples passed 3 passed 2 cracked |

Prior to testing, it was anticipated that it would be improbable for applicant's rubber processing oil, derived from the recycling of used automobile tires, to show "as good as" or comparable with results that could be obtained from oils that were specifically engineered as extender/plasticizing agents and which had become commercially acceptable as standard extender/plasticizing agents.

It was quite surprising and unexpected that the experimental oil (formulation #2) as shown during Test #3 compared quite favorably with the physical properties of the commercially available Sundex 790 formulation. The curing rates and the tensile strengths were quite similar. It was very surprising that the experimental oil (formulation #2) had a consistently greater reduction in the modulus of elasticity (more flexible) to suggest that the experimental extender/plasticizing agent of the applicant would be useful in the production of automobile tires such as snow tires and other tires requiring a softer tread while maintaining strong tensile and elongated strengths.

When the applicant's oil was compared with the commercially available Flexon 766 extender/plasticizing oil in EPDM rubber formulation, it likewise had a greatly reduced modulus plus a very significant increase in tensile strength and elongation. Additionally, it can be seen from the results of Test #1 the applicant's oil provided a considerably more flexible product as indicated by the maximum torque. All of these differences were quite surprising and unexpected. Consequently applicant has been able to produce a unique extender/plasticizing agent from recycled automobile tires utilizing a unique pyrolytic process and apparatus. Applicant's unique extender/plasticizing agent was not specifically engineered as an extender/plasticizing agent, but compared favorably, if not more favorably with oils that were specifically engineered as rubber extender/plasticizing agents. This was unexpected.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A used automobile rubber tire recycling apparatus for recovering a petroleum based, rubber process oil from small pieces of used rubber tires, comprising:

an enclosed upright oriented reactor extending between an upper end and a lower end;

feeding means for feeding the small pieces into the reactor adjacent the upper end at a rate sufficient to form a vertical column of layers of small pieces and to maintain a top layer of the vertical column above a desired elevation;

said reactor having vertically oriented side walls of sufficient length for permitting the layers of small pieces to progressively descend through a preheating zone adjacent the upper end in which the small used tire pieces are preheated, a pyrolysis zone between the upper end and the lower end in which the preheated small used tire pieces are further heated and thermally decomposed generating small carbon particles and pyrolytic gases with entrained rubber process oil, and into a combustion zone adjacent the lower end wherein a portion of the small carbon particles are burned generating a hot carbon gas;

gas inlet means for directing an oxygen-bearing gas into the reactor at or below the combustion zone;

temperature control means for limiting the amount of oxygen-bearing gas directed into the reactor to burn a portion of the small carbon particles in a substoichiometric atmosphere in the combustion zone to generate the hot carbon gases of a low combustion temperature of between 340° F. and 500° F.;

solid residue particle outlet means adjacent the lower end of the reactor for discharging any solid residue including any unburned small carbon particles;

gas outlet means for permitted exit of gases from the reactor at the pyrolysis zone below the top layer of the column;

vacuum means communicating with the gas outlet means (1) for applying a vacuum pressure at the gas outlet means to draw the hot carbon gases upward from the combustion zone and through the pyrolytic zone to pyrolytically decompose the preheated small used tire pieces and generate pyrolytic gases containing the rubber process oil, (2) withdrawing the pyrolytic gases from the reactor at the pyrolytic zone below the top layer of the column through the gas outlet at a temperature of between 340° F. and 500° F.;

a condenser communicating with the gas outlet means and the gas conveying means for receiving the withdrawn pyrolytic gases and for separating the rubber process oil from the pyrolytic gases; and wherein the vacuum means includes a fan between the gas outlet means and the condenser for conveying the pyrolytic gas and the entrained rubber process oil to the condenser.

2. The used tire recycling apparatus as defined in claim 1 further comprising comminuting means for forming the tires into small pieces prior to feeding the pieces into the reactor.

3. The used tire recycling apparatus as defined in claim 2 wherein the comminuting means severs the rubber tires into small pieces having a major dimension of approximately 0.50 to 2.0 inches.

4. The used tire recycling apparatus as defined in claim 1 wherein the vertical reactor has a grate immediately below the combustion zone to support the vertical column and wherein the gas inlet means directs the oxygen bearing gas into the reactor both above and below the grate to combust at least a portion of the solid carbon-to hot carbon gases that are directed upward through the vertical column to decompose the small rubber tire pieces.

5. The used tire recycling apparatus as defined in claim 1 further comprising means for preheating the oxygen-bearing gas prior to directing the oxygen-bearing gas into the reactor.

6. The used tire recycling apparatus as defined in claim 1 wherein the condenser is an air cooled condenser operatively connected to the gas outlet means for separating the rubber process oils from the pyrolytic gases, and condenser air flow means for directing the oxygen-bearing gas initially through the air cooled condenser to condense the rubber process oils and to preheat the oxygen-bearing gas prior to directing the oxygen-bearing gas into the reactor.

7. The used tire recycling apparatus as defined in claim 6 further comprising air conditioning means for controlling the temperature of the oxygen-bearing gas to a temperature between 40° F., and 60° F., prior to directing the oxygen-bearing gas initially through the air cooled condenser.

8. The used tire recycling apparatus as defined in claim 1 wherein the gas outlet means includes a plurality of gas outlets formed at angularly spaced locations about the vertical reactor to provide uniform extraction and to minimize gas flow channeling within the reactor.

9. The used tire recycling apparatus as defined in claim 8 wherein the plurality of outlets project inward from inner walls of the vertical reactor to remove the pyrolytic gases and vaporized rubber process oils at uniformly spaced locations spaced inward from the inner walls of the reactor.

10. The used tire recycling apparatus as defined in claim 1 wherein the vacuum means draws the hot carbon gases upward at a velocity of between 500 and 1000 feet/min.

11. The used tire recycling apparatus as defined in claim 1 further comprising storage means for receiving and storing the pyrolytic gases after the rubber process oils have been separated therefrom.

12. The used tire recycling apparatus as defined in claim 1 further comprising means operatively connected to the storage means for combusting the pyrolytic gases and electrical generating means responsive to the combusted pyrolytic gas for generating electrical energy from the combusted pyrolytic gas.

13. The used tire recycling apparatus as defined in claim 1 wherein the fan conveys the pyrolytic gases and the entrained rubber process oil to the condenser at a velocity of between 4,000 and 10,000 feet/min.

* * * * *